United States Patent [19]
Capriglione, Sr.

[11] Patent Number: 5,403,230
[45] Date of Patent: Apr. 4, 1995

[54] SHELLFISH CLAW CUTTER

[76] Inventor: Anthony Capriglione, Sr., 124 Shore Blvd., Keansburg, N.J. 07734

[21] Appl. No.: 169,228

[22] Filed: Dec. 20, 1993

[51] Int. Cl.⁶ .......................................... A22C 29/02
[52] U.S. Cl. .................................. 452/6; 452/1; 30/120.1; 30/355
[58] Field of Search .............. 452/6, 1, 3, 5, 17; 30/120.1, 355

[56] References Cited

U.S. PATENT DOCUMENTS

| D. 196,381 | 9/1963 | Basilotta | 452/17 |
|---|---|---|---|
| 2,792,590 | 5/1957 | Stone | 452/6 |
| 2,800,714 | 7/1957 | Evans | 30/355 |
| 2,822,845 | 2/1958 | Medlin | 452/194 |
| 3,192,623 | 7/1965 | Guerrero | 30/355 |
| 3,271,814 | 9/1966 | Gorton, Jr. | 452/3 |
| 3,353,207 | 11/1967 | Weinberger | 452/3 |
| 3,681,846 | 8/1972 | Gerber | 30/355 |
| 4,200,961 | 5/1980 | Mueller | 452/6 |
| 4,569,103 | 2/1986 | Taurinskas | 452/6 |
| 5,080,629 | 1/1992 | Ellison | 30/120.1 |

FOREIGN PATENT DOCUMENTS 843819  9/1938  France ................. 452/17

Primary Examiner—Willis Little
Attorney, Agent, or Firm—Charles F. Gunderson

[57] ABSTRACT

A device for opening the shells of crustaceans has an inner portion and an outer portion extending from a handle section at one end to a cutting section at the other end. In the cutting section, the inner portion has a sharpened end at the start of a cutting or fracturing edge that tapers upward toward the handle. The cutting section of the outer portion has sides that taper downward on each side of the cutting edge toward the handle, overlapping the cutting edge about halfway down. The outer portion fits loosely over the inner portion, to be removable for cleaning etc. The inner portion cutting edge thickens as it tapers upward for increased strength in cutting harder shells, and the sides of the outer portion cutting section become fulcrums when the handle is raised to lever the cutting edge of the inner portion through the crustacean's shell to expose the shellfish meat.

7 Claims, 1 Drawing Sheet

SHELLFISH CLAW CUTTER

BACKGROUND OF THE INVENTION

Shellfish are delicacies that are much enjoyed by almost all gourmets. Their meat is unique, and enjoyable, no matter how it is served. Among the most tasty are lobsters, crabs, and other similar crustaceans, and even crab legs from larger species. There are innumerable species, with subtle variations in texture and flavor, but almost all are within a hard shell casing. Actually, this varies from a very soft shell, at the time of shedding, to, in the matter of hours, a paper shell, and then, for several months, a very hard shell, which is, for the most part, its normal condition.

In any case, the meat must be taken out of the shell to be enjoyed, and this is the problem. To get the meat out, the crab must be killed—usually by cooking—so that the meat can be extracted. This can be, and is done commercially, but the extracted meat must be canned or stored for later use, which loses some of the freshness, if not the flavor. On the other hand, fresh shellfish, promptly and properly cooked, is at its best served immediately. However, it then becomes the chore of the eater to take the fresh meat out of the shell.

This is not easy. It is one of the unique dining experiences where you must use your fingers, and other unique tools. Restaurants that specialize in seafood of this kind supply everything from nutcrackers to wooden boards and mallets to break the shells, and forks and picks to draw the meat out of the shells. This is well worth the effort, but the breaking of the shells often damages the meat, which is, naturally, in tangible chunks, but of a delicate texture. If the meat is broken up, or shredded, by the breaking of the shells, it can be more difficult to extract or pick up the minute, succulent shreds of meat.

This is messy, but is still effective, where the shells can be fractured by a nut cracker or mallet, and opened. However, some of the time, particularly with crab legs, the shells are sill flexible and will not open with any tool on the table. What is needed is a device that can quickly, cleanly, and neatly open the shell of any part of a shellfish to enjoy its meat at its best with a minimum of effort and mess.

What is needed is a long, sharp, pointed tool, like the tine of a fork, to insert at one end of a leg or claw with some means for cutting or fracturing the shell to expose the meat. Scissors, with a long thin sharp blade—31-though awkward at the table and hard to clean—would do for long, thin crab legs, but would not be able to cut through hardened lobster or crab claws.

The object of his invention is to provide a simple, but unique tool that can be inserted into the end of a crab leg to cut and open either a soft or a hard shell, quickly and simply, and expose all the meat to be picked up in solid pieces by finger or fork with no wasted shreds—or bits of the fractured shell to avoid.

SUMMARY OF THE INVENTION

A device for opening a cooked crustacean shell has an elongated, tapered, sharp-pointed blade for inserting into one end of the shell where it is to be opened to extract the meat. The blade is encased in an equally elongated casing with a flattened end above the sharp point of the tapered blade, and sides tapering down to overlap the sharp upper edge of the tapered blade on both sides. The other ends of both the blade and the casing join in a handle. This provides a firm grip and control for inserting the sharp end of the tapered blade under the shell of the crustacean so that the sharp upper edge of the blade can slice it open, if it is a soft shell, or pry it open, with a flattened end of the elongated casing as the fulcrum of a lever, if the shell is hard.

DETAILED DESCRIPTION OF THE DRAWINGS

Figure 1:
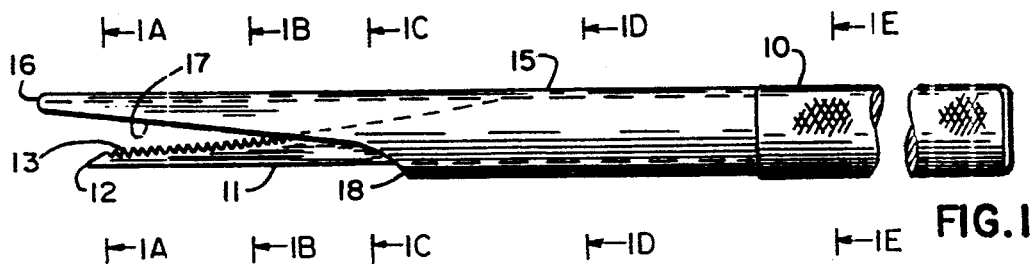
FIG. 1 is a side view of one of the species of this invention in an operating condition.

Referring now more particularly to FIG. 1, a side view of a basic embodiment of this invention is shown. Here the device is in a position to be inserted into a portion of the shell of a crab or lobster claw, or other, similar, shellfish parts to open the shell.

In this species a handle 10 is shown, connected to an elongated cutter 11, with a sharp, serrated edge 13 tapering down to a pointed end 12. The elongated cutter 11 is surrounded and supported by a tubular sleeve 15, with a sloping edge 17, overlapping the elongated cutter edge 13, tapering up to a flattened end 16. The other end of the sloping edge ends and at 18 within the full tubular sleeve that extends to the handle. The shape and overlap of these elements is essential and critical, and will be illustrated in more detail in FIGS. 1A to 1E.

FIGS. 1A to 1E are end views of cross sections of segments of the device of FIG. 1. Segments are shown to more clearly show the function of these parts. In all of these figures, similar elements are similarly numbered.

Figures 1A, 1B, 1C, 1D, 1E:
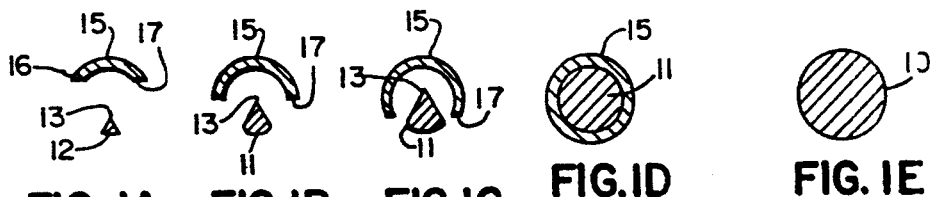
FIGS. 1A to 1E are cross sections of end views of the device of FIG. 1 along the lines 1A—1A to 1E—1E of FIG. 1, respectively.

FIG. 1A shows an end view of the device looking towards the lines 1A—1A of FIG. 1. This shows the pointed end 12 of the elongated cutter, and the start of the sharpened upper edge 13. Above this is seen the nearly-flattened end 16 of the tubular sleeve 15, and the start of the tapered slope 17.

FIG. 1B is the end view of the next cross section, along the lines 1B—1B of FIG. 1, showing a part of the elongated cutter 11 with its sharp, upper cutting edge 13, higher, since it is tapering upwards, and closer to the edge of the slope 17, of the tubular sleeve 15, that is tapering downwards. FIG. 1C is the end view of the next cross section along the lines 1C—1C of FIG. 1. Here the upwards-sloping cutting edge 13 of the elongated cutter 11 is now overlapped by the downward-sloping edge 17 of the tubular sleeve 15.

FIG. 1D us the end view of the next cross section, along the lines 1D—1D of FIG. 1. This shows the base of the elongated cutter filling and tightly secured within the base of the tubular sleeve 15, which, in this case, can end before the handle 10, which is secured to or may be part of the base of the elongated cutter 11. This is seen in FIG. 1E, which is an end view of the last cross section along the lines 1E—1E of FIG. 1, which is a cross section of the handle 10.

In operation, the pointed end 12 of the elongated cutter 11 is inserted into an opening at either end of a claw, leg, or shell, of any crustacean, and pushed through, above the meat if possible, to cut or break open the shell to expose the edible meat. If the shell is not too hard, the pressure of the downward-sloping, smooth edge 17 can force the shell down on the upward-sloping, sharp cutting edge 13 of the elonged cutter 11 to cut or break the shell as the cutter slides along under the shell.

If, on the other hand, the shell is harder, and the sliding pressure of the tapered slope is not enough to break through the shell, merely raising the handle 10 will push the flattened end 16 down on the hard shell to act as a fulcrum for the sharp and strong upper edge 13 of the cutter to break through a comparatively-thicker shell. The unique structure of this device permits the double function of a slicer for thin shells, or a leveraged opener for harder shells; in either case making a quick, clean break in the shell to expose the meat.

In this embodiment, the inner, elongated cutter must have a sharp end 12 to penetrate below the shell, and a tapered, sharp edge 13 to cut through the shell. The sharp, tapered edge will increase in thickness and in strength as it rises, and its sharp upper edge 13 may be serrated to provide a stronger cutter for heavier shells.

However, the inner elongated cutter is turned into a smooth, rounded end toward the handle, around which the tubular sleeve 15 can be rotated to actually cover the pointed end when not in use. More important, the tubular sleeve may also be pulled off for replacement, repair or daily cleaning, which is very sensible and important for sanitary considerations.

Figure 2:
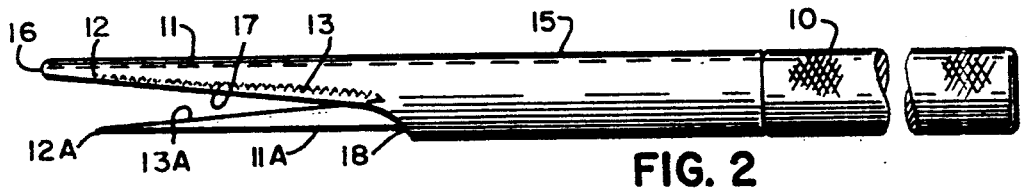
FIG. 2 is a side view of another of the species of FIG. 1 in a secondary operating condition.

It should be noted that, for tougher shells, the pressure on the end 16 of the sleeve 15 and on the portion of the sleeve 18 that lifts the cutter, as well as on a given portion of the sharp edge of the cutter itself may be considerable. However, in this design, the elongated cutter can be of stainless steel, or the like, as heavy as necessary to fracture and break open even a heavy crab or lobster claw, but still narrow enough at its pointed end to be inserted into an end of the claw. Similarly, the sleeve can be of metal, and thick enough to apply pressure at 16 and withstand the force at 18. The curve of the tubular sleeve 15, along the taper 17 will, obviously be of an ideal geometric shape and thickness for enough strength to fracture the shell of an average crustacean FIG. 2 shows another side view of another variation or embodiment of this invention. Here the elongated cutter has a secondary cutter arm 11A with a, comparatively, sharper pointed end 12A, and a, comparatively, thinner and sharper cutting edge 13A. This is suggested for opening the thinner, more resillient parts of shells that are found, particularly in crab legs. Here, the thinner, sharper cutter blade will easily open the side of a crab leg to expose the meat quickly, and with a minimum of damage. This blade, on the other hand, would not, and need not, be strong enough to pry open a heavier lobster or crab claw or back.

In this case, the elongated cutter 11A can be made an additional part of the basic, elongated unit 11 that joins the handle, and rotates within the sleeve 15. This provides a choice of a sharp, delicate blade 13A for light cutting, or the heavier and much-stronger blade 13 for prying and cutting open heavier shells.

Figure 3:
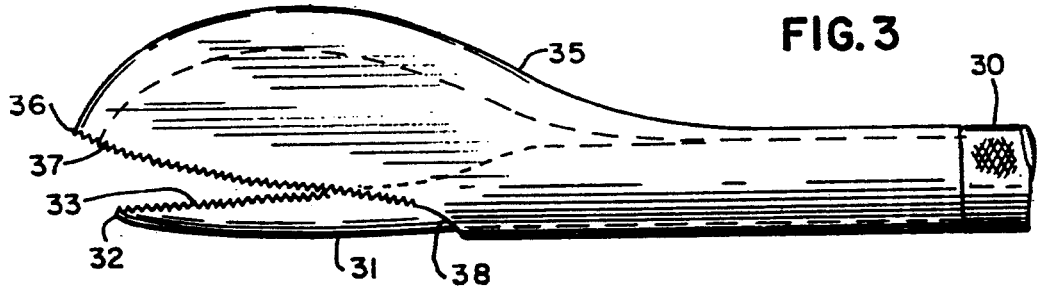
FIG. 3 is a side view of another of the species of this invention in an operating condition.

Another variation of this concept is seen in the side view of FIG. 3. This is, obviously, formed in the shape of a lobster claw, which suggests its function. However, oddly enough, this shape provides a natural strength for the upper portion of the lever, as will be seen in the subsequent figures, and this may make possible a plastic, rather than a metal structure.

In this figure, the handle ends at 30, and is attached to an elongated cutter 31, similar in function to that of FIG. 1. This also extends through an outer sleeve—of similar function, but different shape—to the tapered, sharp, serrated slope 33 and to a pointed end 32. This is similar in shape and function to the elongated cutter 11, with its pointed end 12, and cutting edge 13 of FIG. 1. The end portion of the outer sleeve, again, becomes the fulcrum of the lever to lift the strengthened edge 33 of the cutter 31 against the inside of the claw shell. This puts stress against the area 38, which, again, must be strong enough to lift and support the edge 33 of the cutter 31 when the handle is lifted to provide the necessary leverage.

It should be particularly noted that, in this case, the tapered slope 37, on the under side of the open end of 35, is curved. This provides a variable fulcrum that begins at the edge of the shell at the point where the cutting edge is when the handle of the lever arm is lifted. This fulcrum moves forward, as the shell breaks, to provide the maximum possible leverage during the entire opening process. Without this curvature, the lifting of the handle would normally bring down the flattened end, such as 16 in FIGS. 1 and 2, in contact with the claw to serve as the fulcrum, at a fraction of the mechanical advantage provided by the variable fulcrum. This curved upper slope, and variable fulcrum could also be applied to the species of FIGS. 1, and 2, with similar improvement in the lever functions.

The outer sleeve 35, in this case, may extend further back to form the handle—which could be done in any version—but its working end is shaped, esthetically, to resemble a lobster claw. Here, again, the inner, elongated cutter can be pulled out for repair or replacement, and especially cleaning. However, the elongated cutter may, or may not, be rotatable to be protected within the claw portion. This is a matter of design.

The FIGS. 3A through 3F, again, are end views of cross sections of segments of the device along points 3A—3A through 3F—3F of FIG. 3, respectively. These figures clearly show the potential mechanical strength of the shape of a lobster claw—evolved by nature for this purpose.

Figures 3A, 3B, 3C, 3D, 3E, 3F:
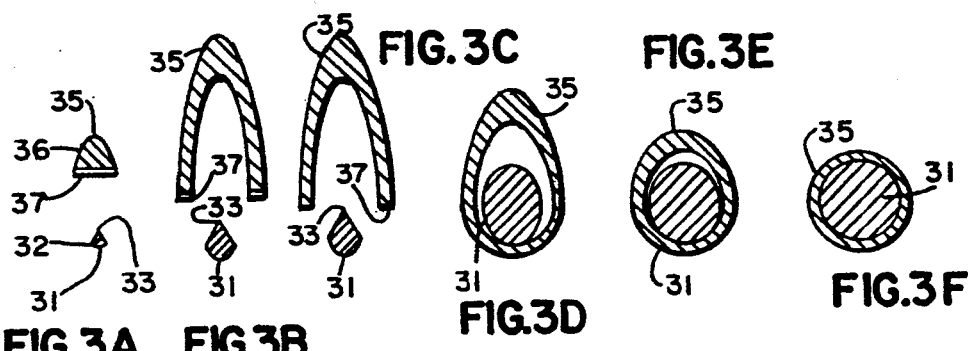
FIGS. 3A to 3F are cross sections of end views of the device of FIG. 3 along the lines 3A—3A to 3F—3F of FIG. 3, respectively.

In FIG. 3A the flattened end 36 is shown at the end of the outer sleeve 35, leading into the tapered section 37, along the lines 3A—3A of FIG. 3. The flattened end 36, again, can provide a fulcrum for the shell-breaking lever activated by the the handle 30 forcing the tapered section 33 against the inside of the claw.

FIGS. 3B and 3C are end views of cross sections along the lines 3B—3B and 3C—3C of FIG. 3 These show the arching of the back 35 of the claw, as the downward tapering section 37 overlaps the upward-tapering, sharp, serrated cutter edge 33, and the thickening and strengthening of the elongated cutter 31 as its sharp, serrated cutting edge 33 overlaps the tapered section 37 of the claw FIGS. 3D, 3E, and 3F are end views of cross sections of the device of FIG. 3 along the lines 3D—3D, 3E—3E, and 3F—3F of FIG. 3 These merely show the tapering down of the back of the claw, and the change in the elongated cutter, as it forms the handle. In this case the end of the sleeve may form the handle, with only a small portion 30 at the end of the cutter provided for removing the cutter from the sleeve for washing or replacing.

I claim:

1. A shell opener for crustaceans has an outer portion surrounding an inner portion; said shell opener having a handle end and a cutting end; a central portion extending from said handle end to said cutting end; said cutting end of said inner portion having a sharp point adjoining an upward-tapering edge, through said central portion, toward said handle end; said cutting, end of said outer portion having a flattened end, spaced from and opposing said sharp point of said inner portion; said cutting end of said outer portion having downward-tapering sides along said central portion toward said handle end; said downward-tapering sides overlapping each side of said upward-tapering edge of said inner portion before said handle portion, whereby said sharp end of said inner portion can be pushed under a shell, and said sides of said outer portion can engage the outside of said shell to act as a fulcrum when said handle is raised for said edge of said cutting end of said inner portion to fracture said shell.

2. A shell opener, as in claim 1, wherein said inner portion can be removed from said outer portion for cleaning or replacement.

3. A shell opener, as in claim 1, wherein said upward-tapering edge of said cutting end of said inner portion is narrow and sharp enough to cut through relatively thin shells.

4. A shell opener, as in claim 1, wherein said upward-tapering edge of said cutting end of said inner portion is serrated, and heavy enough to break through relatively heavy shells.

5. A shell opener as in claim 1 wherein said inner portion becomes circular in said handle end, and said outer portion becomes tubular in said handle end, so that said inner portion can be rotated within said outer portion; said cutting end of said inner portion having a narrow and sharp edge on one side and a serrated edge on the other side to open soft shells in one position, and hard shells in another position of rotation.

6. A shell opener as in claim 1, wherein said upward-tapering edge of said cutting end of said inner portion is straight, and said downward-tapering sides of said outer portion are curved and serrated to provide variable fulcrum points on either side of said cutting edge for maximum leverage at any point.

7. A shell opener, as in claim 1, wherein said cutting end of said outer portion extends upwards on either side of said cutting edge of said tapered inner portion for additional strength.

* * * * *